United States Patent [19]

Leiber

[11] 4,111,496

[45] Sep. 5, 1978

[54] HYDRAULIC BRAKE BOOSTER

[75] Inventor: Heinz Leiber, Leimen, Fed. Rep. of Germany

[73] Assignee: Robert Bosch GmbH, Stuttgart, Fed. Rep. of Germany

[21] Appl. No.: 772,208

[22] Filed: Feb. 25, 1977

[30] Foreign Application Priority Data

Mar. 10, 1976 [DE] Fed. Rep. of Germany ....... 2609904

[51] Int. Cl.² .................... B60T 17/18; B60T 13/14
[52] U.S. Cl. ..................................... 303/92; 303/114
[58] Field of Search .................. 188/181 A; 303/6 C, 303/9, 92, 114, 116; 60/552

[56] References Cited

U.S. PATENT DOCUMENTS

| 3,827,763 | 8/1974 | Kobashi et al. | 303/114 |
| 3,871,717 | 3/1975 | Jensen | 303/92 |
| 3,910,645 | 10/1975 | Takeuchi et al. | 303/92 X |

*Primary Examiner*—Duane A. Reger
*Attorney, Agent, or Firm*—Edwin E. Greigg

[57] ABSTRACT

A master cylinder for a two-circuit brake system which includes an anti-skid control has two separate chambers and pistons. The main control piston is associated with an auxiliary piston which it engages after a predetermined amount of travel. The brake pedal is arranged to actuate inlet and outlet valves and a selector piston provided with an array of longitudinally disposed rods is arranged to actuate the inlet valve. The control piston communicates with a ⅜-way valve and therethrough flow to said control piston can be interrupted upon pressure failure.

3 Claims, 2 Drawing Figures

HYDRAULIC BRAKE BOOSTER

BACKGROUND OF THE INVENTION

The invention relates to improvements in a hydraulic brake booster for a vehicular brake system, which is actuated together with a travel spring by a brake pedal, which further is provided with a valve that controls both the interconnection of a storage source with a booster cylinder that includes a booster piston in the brake booster as well as the interconnection of the booster cylinder with a relief station. Further the brake booster includes a hydraulic dual-circuit main cylinder having a double piston for the sealing of the primary and of the secondary side and in which the booster piston is constructed as a stepped piston.

For a better understanding of this invention, reference is now made to the Leiber patent application Ser. No. 703,799, filed July 9, 1976, which is also assigned to the assignee of the present application.

On the one hand, when such brake boosters are used for wheel lock-up prevention, various problems arise. When, for example, the double pistons in the hydraulic main cylinder are used as reference pistons between the rear axle brake circuit equipped with a lock-up protection switch valve and the front axle brake circuit, then the booster piston push rod which enters the primary chamber of the main cylinder, when driven hard by large pedal forces at low reserve pressures, interferes with the free mobility of the double pistons. On the other hand, the wheel lock-up prevention function is no longer required upon the loss of the reserve pressure because the then unassisted force of the foot no longer suffices to cause the brakes to lock.

OBJECT AND SUMMARY OF THE INVENTION

Accordingly, it is the principal object of the present invention to provide a brake booster of the general kind cited above, which is also usable for lockage protected brakes, wherein the wheel lock-up prevention is to be disabled upon the loss of the reserve pressure.

This objective is achieved, according to the invention, by the fact that when the brake booster is used with wheel lock-up prevention type brakes, the annular surface of the stepped booster piston is ordinarily subjected to the pressure from the storage source and that this pressure effect may be discontinued by means of a switch valve upon the loss or the fall of the pressure from the storage source.

In this manner, the volume of the storage source can be very small since the given effective volume includes a larger reserve pressure region.

Other objects and advantages of the present invention will be more readily apparent from a further consideration of the following detailed description of the drawing illustrating a preferred embodiment of the invention, in which:

DESCRIPTION OF THE PREFERRED EMBODIMENT

Figure 1:
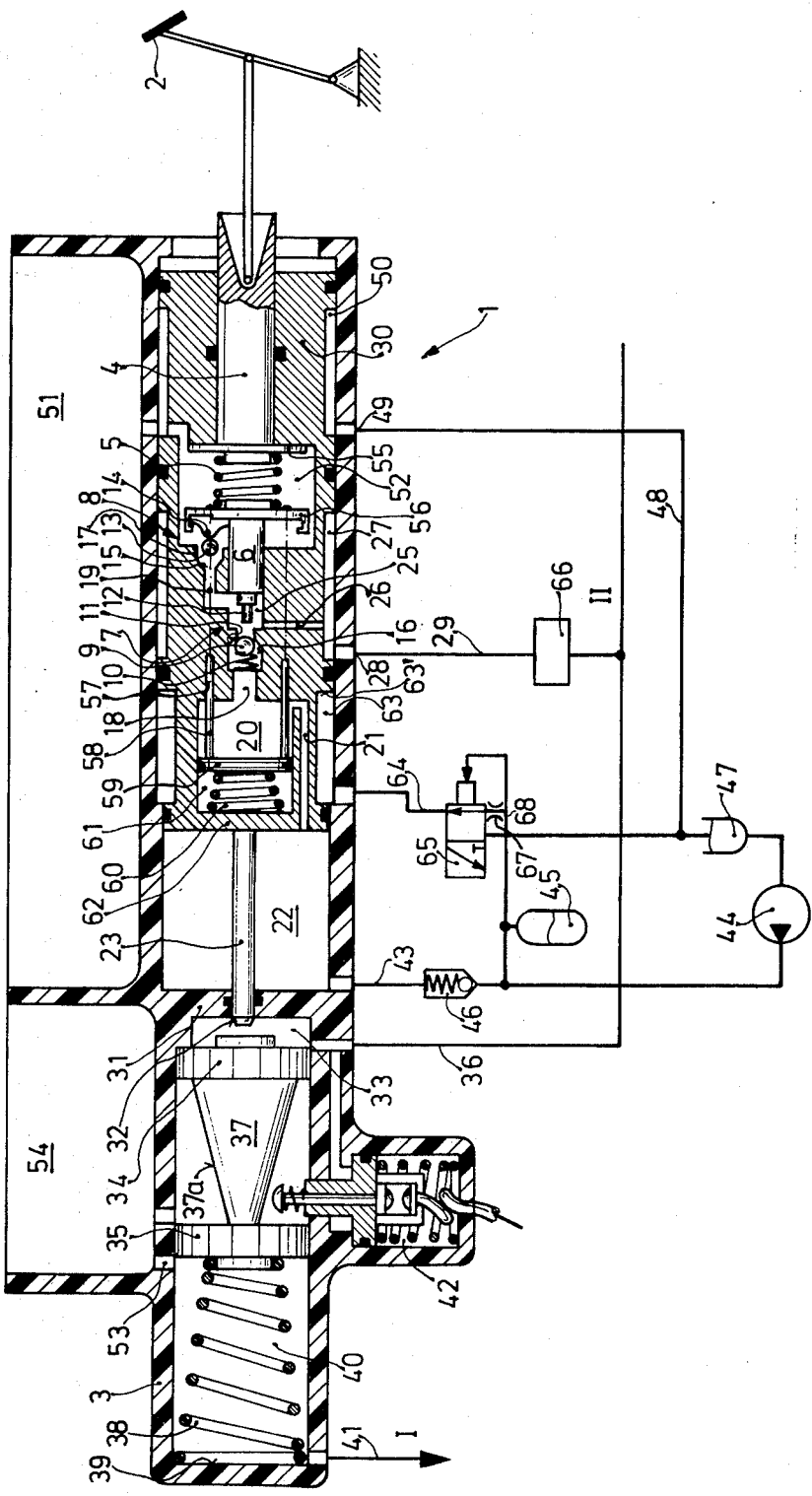
FIG. 1 is a first embodiment of the brake booster.

Turning now to the drawings, it will be observed that a hydraulic brake booster 1 is disposed between a brake pedal 2 and a hydraulic dual-circuit main cylinder 3 of tandem construction. The brake booster 1 has a control piston 4 which acts via a longitudinally disposed travel spring 5 upon a stub shaft 12 which extends from a push rod 6 of double valves 7 and 8.

The valve 7 of the double valve is the inlet valve. This inlet valve is located coaxially relative to the control piston 4 and includes a spherical closure body 9 which ordinarily rests on its valve seat 11 under the force of a spring 10, and which can be lifted off its seat 11 by means of the push rod extension 12 that is carried by the stub shaft 6 that is in turn axially aligned with the control piston 4 and spaced therefrom by the spring 5. The other valve 8 functions as an outlet valve of the brake booster 1 and, as shown, is offset from the center and oriented parallel to the axis of the booster. A closure body 13 likewise constructed as a ball or sphere is carried by a projection 14 on the stub shaft of the push rod 6, and is intended to cooperate with a valve seat 15.

The two valve seats 11 and 15 are constructed as enlarged bores 16 and 17 of the ducts 18 and 19 that are provided within a booster piston 30. The duct 18 leads via a pressure-medium working chamber 20 and via a longitudinal communicating duct 21 in the booster piston 30 into a pressure chamber 22 which contains a push rod 23 carried by the booster piston 30 and axially aligned with the control piston 4. The other duct 19 communicates with a chamber 25 that surrounds the extension 12 on the push rod and a radial duct 26 extends from the chamber 25 there and leads to a cylindrical recess 27 arranged in the booster piston 30. The recess 27 is arranged to communicate at all times with a port 28 that is connected via a line 29 with the brake circuit II.

The pressure chamber 22 of the brake booster 1 is arranged in spaced relation relative to the hydraulic main cylinder 3 by an axially perforated wall 31 which includes a sealing means that is penetrated by the free terminal end 32 of the push rod 23. The free terminal end 32 of push rod 23 thus extends into a primary pressure chamber 33 in which is reciprocably positioned double pistons 34 and 35. The pressure chamber 33 is likewise connected via a line 36 with the brake circuit II.

The frustum that is disposed between the two pistons 34 and 35 thus has a sloping wall 37a which converges toward the secondary piston 35. A return spring 38 is disposed in chamber 40 and includes one end that is adapted to thrust against the base 39 of the main cylinder 3 while the other end thereof abuts against the piston 35. Accordingly, the chamber 40 that is located between the base 39 and the piston 35 provides the secondary pressure chamber of the main cylinder 3 and a line 41 that is connected with the brake circuit I communicates with the chamber 40 adjacent to the wall 39. A mechanical or else purely pressure dependently actuatable electrical warning device 42, which responds upon a malfunction during the pressure rise in the two brake circuits I and II, is attached to the main cylinder 3.

The pressure chamber 22 is connected via a line 43 with the pressure side of a pump 44 and with a pressure reservoir 45 which serves as the storage source. A check valve 46 opening toward the pressure chamber 22 is inserted into the line 43 to prevent backflow. The suction side of the pump 44 is connected to a reservoir 47 that is linked via a line 48 to a junction 49 at the brake booster 1. The junction 49 communicates with a cylindrical recess 50 provided in the booster piston 30, and in turn the recess 50 communicates with both a refill container 51 as well as with a relief chamber 52 of the booster piston 30, which contains the spring 5. The chamber 40 also communicates via a vent hole 53 with a refill container 54, when the brake has been released.

One side of the travel spring 5 presses against a plate 55 that is attached to the inner end of the actuating rod 4 and the other side of the spring abuts against a spring dish 56 which provides a stop means carried by the stub shaft of push rod 6. Three longitudinal borings 57 oriented parallel to the axis of the booster piston 30 are distributed in a circular pattern around the control valves 7 and 8, and rods 58 associated with piston 59 are inserted into the borings 57. It will be noted from the drawing that the diameter of the circular pattern of which the rods 58 are comprised is smaller than the overall diameter of the spring dish 56. These three rods 58 thus comprise the piston rod of a selector piston 59 that is incorporated into the booster piston 30 and thereby provide the means to separate the pressure-medium working chamber 20 from a spring chamber 61 that contains a spring 60. The pressure-medium working chamber 20 communicates with the pressure chamber 22 via a longitudinal duct 21 that is provided in the booster piston 30.

The booster piston 30 is constructed as a stepped piston and the pressure chamber 22 is confined between the front of the small piston 62 and the wall 62a. An annular chamber 63 bounded by the annular surface 63' of the stepped booster piston 30 connects via a line 64 to a 3/2-way valve 65, which can connect this annular chamber 63 reserve-pressure dependently either with the pressure reservoir 45 (as shown in drawing) or else with the reservoir 47. A wheel lock-up prevention device 66 which serves to monitor the pressure in the brake circuit II and and also to prevent wheel lock-up is provided in the line 29.

OPERATION

The improved brake booster described hereinbefore functions in the following manner.

The movable parts of the brake booster when the brake has been released then assume the positions depicted in the drawings. When, during braking, the pedal 2 is actuated by means of the push rod 6, the outlet valve 8 is first closed, i.e., after the traversal of the gap bridged by the travel spring 5. The closure of the outlet valve 8 interrupts the connection of the brake circuit II with the refill container 51 and with the reservoir 47.

During a continued longitudinal movement of the pedal 2 the extension 12 provided on the push rod 6 pushes the spherical inlet valve 7 open. At this time pump pressure from the pressure chamber 22 can now propagate into the line 29 and to the brake circuit II. However, it is to be noted that this pressure also acts in the primary pressure chamber 33 via the line 36. The double pistons 34 and 35 are displaced to the left (as shown in the drawing) against the force of the spring 38. After the piston 35 travels past the vent hole 53, the pressurized fluid in the chamber 40 is then allowed to flow into the brake circuit I via the line 41. The pressure in the brake circuit I thus corresponds to the pressure in the brake circuit II monitored by means of the wheel lock-up prevention device 66 to prevent the wheels from locking during braking. The double pistons 34 and 35 assume various positions according to the given pressures prevalent, however, during these maneuvers the double pistons 34 and 35 are not obstructed or hindered by the terminal end 32 of the push rod 23. Upon the occurrence of excessively large pressure differences between the two brake circuits I and II, the motor vehicle driver is informed of any malfunction through the response of the warning device 42.

The magnitude of the reserve pressure is ordinarily 120 to 230 atmospheres. This pressure also acts in the annular chamber 63 and this usually assures that the stepped booster piston does not move or else moves only slightly. (A slight movement by the booster piston is desired in order that it shall not get stuck in its surrounding bore due to corrosion).

When the reserve pressure falls below a magnitude of approximately 80 atmospheres or is lost entirely, then the switch valve 65 responds and connects the annular chamber 63 with the reservoir 47. The booster piston 30 previously immobilized by the reserve pressure is thereby relieved of the pressure in the annular chamber 63 and can, even with a residual pressure in the pressure chamber 22, be used for the pressurization by means of the force of the foot alone. In that case, the booster piston 30 moves with its push rod 23 upon the application of the correspondingly required pedal force. The volumetric content of the chamber 22 is displaced therefrom through the valve 7 by means of the piston 30 and reaches the lines 29 and 36. The line pressure is proportional to the applied pedal force and is determined by the area of the piston 62. In the event of a leakage in the line 29 or in the line 36 no counter-pressure develops in the chamber 22, which results in the fact that the push rod 23 transmits the pedal force to the piston 37, thereby generating a pressure in the line 41 that is once again proportional to the applied pedal force.

When an empty pressure reservoir 45 is being filled by means of the pump 44, then a certain pressure level leads to the switching of the valve 65. Since simple 2/3 valves do not possess bistable switching characteristics, an intermediate attitude would ensue in which the pressure reservoir 45 could discharge its contents into the return line. In order to nullify this problem, the feed line 68 is equipped with a throttle 67. The throughflow capacity of this throttle 67 is less than the conveyance quantity of the pump. In this way the switch valve 65 then possesses a bistable switching characteristic. Accordingly, it can be seen that the 3/2-way valve 65 has three connectors and two switch positions. It is activated by the pressure in the storage chamber 45 by means of a connector on the left side of the valve 65. In the shown first position, the storage chamber 45 is connected to the annular chamber 63. In the second position of the valve 65 (when the chamber pressure drops) the annular chamber 63 is connected with the reservoir 47 by means of an arrow 65.

The selector piston 59 with its accessory components serves to disable the travel spring 5 upon any loss of reserve pressure, in order that no waste motion need be taken into account in the event of that malfunction in the brake system.

Figure 2:
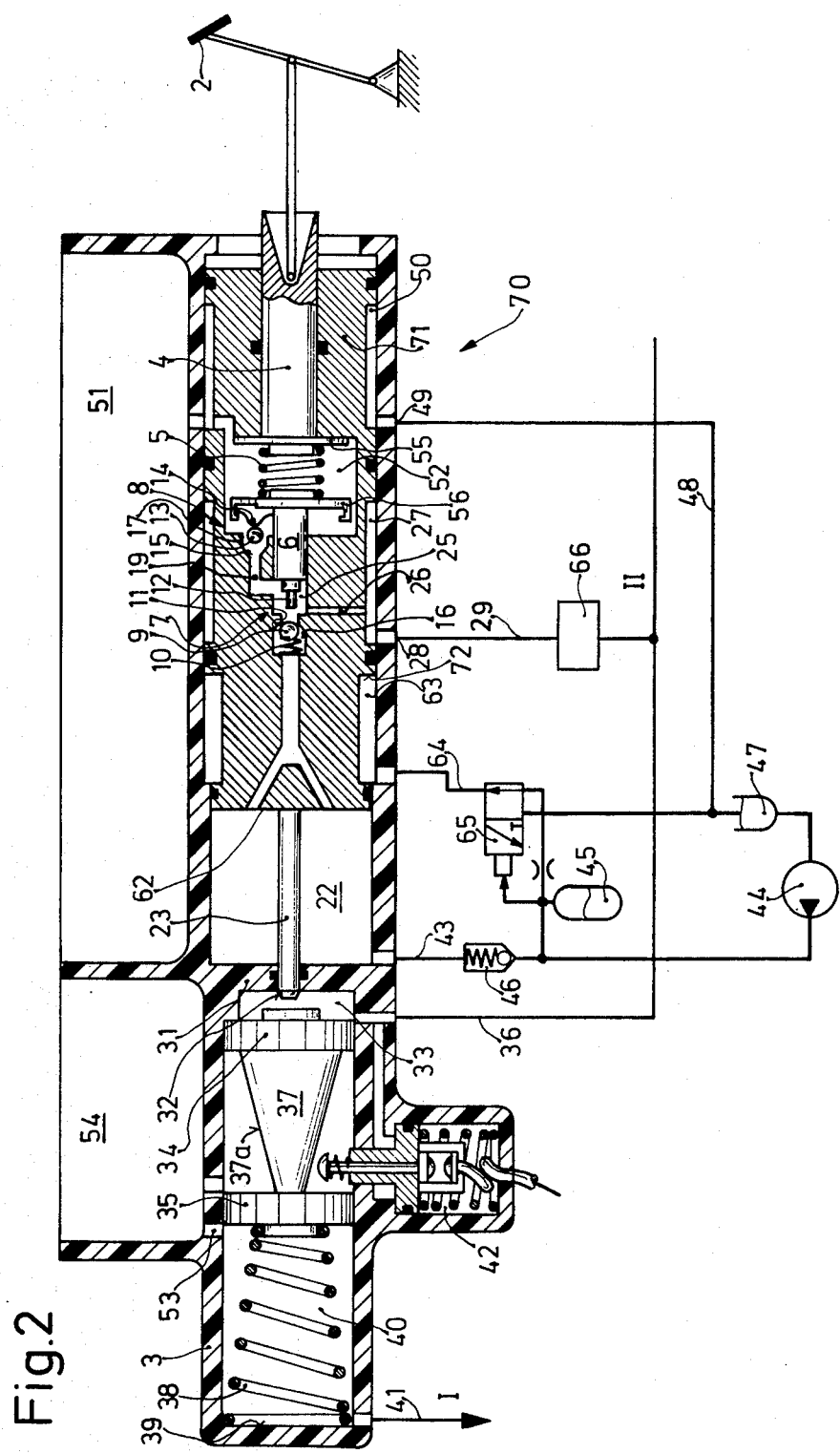
FIG. 2 is a modification of the construction design according to FIG. 1.

FIG. 2 shows another embodiment of the invention for the brake booster. However, since this brake booster is designed to have substantially the same characteristics as those revealed in the construction design according to FIG. 1, the same reference numerals are extensively used in the drawing of FIG. 2. In the embodiment depicted in FIG. 2, a brake booster 70 is shown to have a different type of stepped piston 71. This stepped piston 71 has an annular surface 72 having the same purpose as the annular surface 63' of FIG. 1.

The function of the wheel lock-up prevention device 66 is shown and described in more detail in the pending patent application Ser. No. 624,572.

What is claimed is:

1. In a master brake cylinder for two-circuit braking systems including a housing, a control piston sliding within an booster piston, a brake control valve, actuated by said control piston, for establishing fluid communication between said master cylinder and the first and second of said two brake circuits, said control piston having means for engaging and carrying along said booster piston after a predetermined amount of axial travel, and including a second main cylinder and piston for said second braking circuit, the improvement wherein said control piston includes an annular chamber which is in communication with a line leading to a 3/2-way valve, said 3/2-way valve being constructed to control flow between said annular chamber, a storage source and a pressure reservoir, whereby pressure on said control piston can be interrupted upon pressure failure.

2. The apparatus as defined by claim 1, in which said 3/2-way valve is actuated by pressure from said storage source.

3. The apparatus as defined by claim 1, in which the line leading to said 3/2-way valve includes a throttle means.

* * * * *